April 2, 1968  H. B. PHELPS  3,376,406
FREEZER BELT DEFROSTER UNIT
Filed July 26, 1965
FIG.1
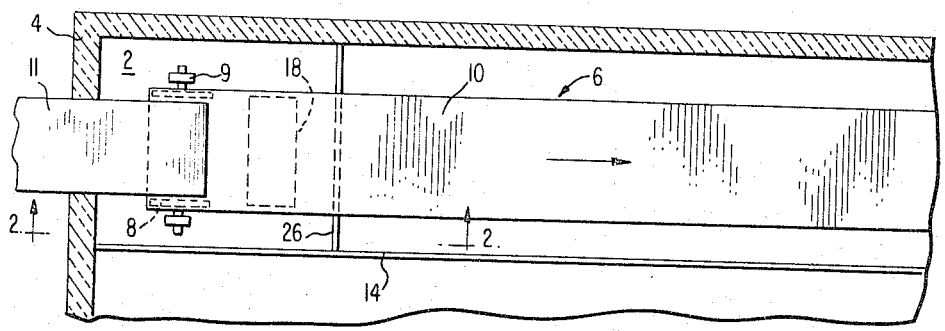
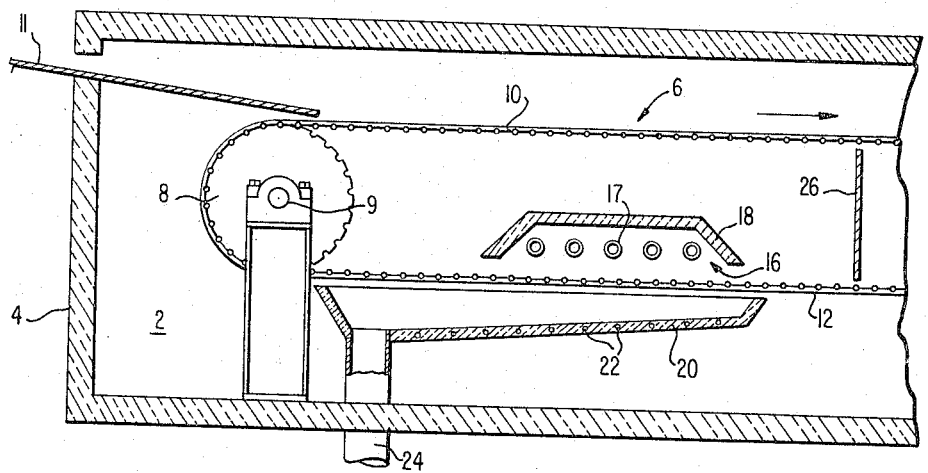
FIG.2
INVENTOR
HERBERT B. PHELPS
BY *James H. Littlefage*
ATTORNEY 3,376,406
FREEZER BELT DEFROSTER UNIT
Herbert B. Phelps, 1685 Overton Park,
Memphis, Tenn. 38112
Filed July 26, 1965, Ser. No. 474,643
7 Claims. (Cl. 219—388)

ABSTRACT OF THE DISCLOSURE

In a food freezer room there is an endless belt which carries on its top run food being frozen from one end of the room to the other, the belt running over sprockets at each end of the room. Disposed over the lower belt run just before it reaches the sprocket at the input end of the room is a radiant electric heater, and disposed under the lower belt run at the same location is a heated drain pan with a drain pipe leading from the room so as to catch the drippings of the belt which are melted therefrom by the radiant heater.

---

This invention relates to food freezer plants of the type wherein the food is transported through a cold chamber on an endless conveyor belt and, more particularly, to a device for defrosting the belt.

In food freezer plants of the type under consideration, the food to be frozen is placed, by suitable feed means, on the upper run of a horizontal conveyor, comprising a mesh belt suitably driven by powered sprockets, and cold air is blown downwardly or upwardly onto the food on the belt. The belt runs from end to end through a cold room, which is sometimes maintained as low as —40° or —50° F. and, when it reaches the output end, the then frozen food thereon is removed. In the present instance, the belt runs entirely within the cold room and, in so doing, it sooner or later becomes quite frosted. While a slight amount of moisture which deposits as frost on the belt may come from the air in the cold room, the humidity of which is nearly 100%, most of it is believed to come from the food itself, particularly when fruits or vegetables are being frozen. One prior approach towards solving the frost problem is disclosed in the prior patent to Overbye 3,122,897, which utilizes a steam-heated roller over which the end of a conveyor belt runs. The object now is to provide a means for applying radiant heat directly to the upper side of the lower run of a food-freezer conveyor belt, and further to provide a heated drain pan disposed beneath and closely adjacent the bottom run of the belt in the region generally below the radiant heater. By these means it is intended to melt off and dislodge the frost from the conveyor belt before the latter reaches the sprocket at the return end of the lower run, and to dispose of the water-melt without danger of its re-freezing on the belt.

These and other objects will be apparent from the following specification and drawing, in which:

FIG. 1 is a plan view, partly in horizontal cross-section of the pertinent part of a freezer belt showing the heater enclosure in dotted lines; and, FIG. 2 is a side elevation, partly in vertical cross-section, showing the pertinent part of the freezer belt and the radiant heater and heated, insulated drain pan.

Referring now to the drawing, in which like reference numerals denote similar elements, the invention is embodied in a freezer room 2, which may be of conventional configuration suitably enclosed by walls. A conveyor belt 6, conventionally of perforate fabric, runs from end-to-end through room 2 over sprocket drums at its ends. Sprocket drum 8 at the input end is illustrated. It will be understood that sprocket drum 8 is rotatably supported on suitable bearings 9 at its ends and that it is driven by a suitable source of power so as to drive belt 6 in the direction indicated by the arrows. An air baffle 14 may be provided alongside belt 6 to segregate the space in which it runs from the remainder of room 2. The food to be frozen is fed onto the upper upper run 10 of the belt via suitable infeed means which form no part of the invention and hence are shown only diagrammatically as a chute 11, the food freezes as it passes towards the output end of the freezer room (not shown) and is removed from the belt at the output end of the upper run 10. The lower run 12 of belt 6 returns and passes over sprocket drum 8. Ordinarily, cold air is blown downwardly onto the food as it travels along the upper belt run. Moisture, mostly from fruits and vegetables freezes on the belt and, if allowed to remain there, loads up the belt and blocks the circulation of air therethrough.

In the above environment, all of which is conventional, the invention comprises a radiant electric heater 16, consisting of conventional electrical resistance strips or rods 17 housed within an open-bottom enclosure 18 formed of thermal insulation material supported by suitable brackets (not shown) over the upper side of the lower run 12 of belt 10 so as to radiate heat downwardly onto the lower belt run. Disposed beneath lower belt run 12 is an electrically heated drain pan 20 formed of material which is both thermally and electrically insulating material. In the illustrated embodiment, drain pan 20 is formed of insulating plastic material in which electrical resistance wires 22 are embedded. Drain pan 20 extends beyond the heater 18 in the downstream direction of lower belt run 12 so as to catch all the drippings off the belt run, and is provided with a drain pipe 24 which leads to the exterior of room 2. The electrical resistance elements of heater 16 and drain pan 20 are, of course, connected to a suitable source of electricity which may be left on steadily during all the time while food is being frozen. Alternatively, the source of electricity may be turned on after a predetermined length of time after start-up of the freezer, corresponding to the time normally required for frost to start to build up, or it may be turned on intermittently at sufficiently close intervals to prevent any significant amount of frost from building up. Also, it is within the purview of the invention to provide an air baffle disposed in a vertical plane and extending across the portion of freezer room 2 between baffle 14 and the opposite side wall of the room, and extending vertically from adjacent the underside of upper belt run 10 and the upper side of lower belt run 12 for reducing the circulation of cold air around heater 16.

From the foregoing it will be apparent that radiant heater 16 melts the frost off lower belt run 12, and the melted water drains into pan 20 and out through drain pipe 24. While the primary function of the electrical resistance heating elements 22 in drain pan 20 is to prevent the drain water from refreezing, some of the heat provided thereby is imparted to the lower side of lower belt run 12 further to assist the melting of frost therefrom. Suitable structural supports, not shown, are provided for maintaining heater 18 and drain pan 20 in close proximity to the lower belt run, with preferably only so much spacing therebetween as to avoid interference with the belt.

The invention is not limited to the details disclosed and described herein, but is intended to cover all substitutions, modifications and equivalents within the scope of the following claims:

I claim:

1. In combination with an endless perforate belt having horizontally disposed belt runs in a cold room for freezing fruits, vegetables and the like comestibles, defroster means comprising a radiant electric heater disposed over the upper side of one of said belt runs, and an electrically heated drain receiver disposed beneath the under side of the last-named belt run and beneath the radiant electric heater.

2. The combination claimed in claim 1, said drain receiver being of greater lateral extent in the downstream direction of the last-named belt run than the radiant electric heater.

3. The combination claimed in claim 1, said heater having an open-bottom casing surrounding the top and sides thereof formed of thermally insulating material.

4. A defroster for food freezer belts comprising in combination a food freezer room having an endless perforate belt running horizontally therein over rotating support means at opposite ends thereof, said belt having vertically spaced upper and lower runs, a radiant electric heater disposed between said belt runs and over the upper surface of the lower run, an open-top drain pan disposed beneath the lower surface of the lower belt run and directly below said radiant electric heater, means for heating said drain pan, and a drain pipe leading from said drain pan to the exterior of said freezer room.

5. The combination claimed in claim 4, said radiant electric heater having an open-bottom casing with top and side walls formed of heat-insulating material and having electrical resistance elements enshrouded by said casing.

6. The combination claimed in claim 5, the open bottom of said heater and the open top of said drain pan being respectively disposed closely adjacent the upper and lower surfaces of said lower belt run.

7. The combination claimed in claim 6, said drain pan being of greater lateral extent in the downstream direction of said lower belt run than said heater.

References Cited
UNITED STATES PATENTS

| | | | |
|---|---|---|---|
| 1,235,027 | 7/1917 | Harrison | 198—230 |
| 2,533,125 | 12/1950 | Levinson et al. | 34—5 X |
| 2,668,364 | 2/1954 | Colton | 34—5 X |
| 3,023,296 | 2/1962 | Barber | 219—354 X |
| 3,224,216 | 12/1965 | Crouch | 62—275 X |
| 3,226,947 | 1/1966 | Wakatsuki et al. | 62—380 X |
| 3,252,691 | 5/1966 | Getzin et al. | 198—230 X |

RICHARD M. WOOD, *Primary Examiner.*

C. L. ALBRITTON, *Assistant Examiner.*